United States Patent
Kwon et al.

(10) Patent No.: US 8,619,671 B2
(45) Date of Patent: Dec. 31, 2013

(54) TRANSMISSION RECEPTION APPARATUS OF DATA USING POLARIZATION TRANSMISSION IN LOS RADIO COMMUNICATION SYSTEM

(75) Inventors: Hyoung Jin Kwon, Chungcheongbuk-do (KR); Jin Kyeong Kim, Daejeon (KR); Woo Yong Lee, Daejeon (KR); Yong Sun Kim, Suwon-si (KR); Kyeongpyo Kim, Daejeon (KR); Dongyong Lee, Daejeon (KR); Jong Hwa Choi, Incheon (KR)

(73) Assignee: Electronics and Telecommuniations Research Institute, Daejeon (KR)

( * ) Notice: Subject to any disclaimer, the term of this patent is extended or adjusted under 35 U.S.C. 154(b) by 966 days.

(21) Appl. No.: 12/393,560

(22) Filed: Feb. 26, 2009

(65) Prior Publication Data
US 2009/0213832 A1    Aug. 27, 2009

(30) Foreign Application Priority Data

Feb. 27, 2008  (KR) .................. 10-2008-0018024
Dec. 15, 2008  (KR) .................. 10-2008-0127117

(51) Int. Cl.
*H04W 4/00* (2009.01)
*H04J 7/02* (2006.01)

(52) U.S. Cl.
USPC ........................... 370/328; 370/499

(58) Field of Classification Search
None
See application file for complete search history.

(56) References Cited

U.S. PATENT DOCUMENTS

| | | | |
|---|---|---|---|
| 4,747,160 A * | 5/1988 | Bossard | 455/422.1 |
| 6,061,336 A | 5/2000 | Baker | 370/320 |
| 2004/0121740 A1 * | 6/2004 | Miyano | 455/101 |
| 2005/0213554 A1 * | 9/2005 | Ginzburg et al. | 370/349 |
| 2008/0039012 A1 * | 2/2008 | McKay et al. | 455/11.1 |
| 2008/0130726 A1 * | 6/2008 | Sofer et al. | 375/220 |
| 2008/0175194 A1 * | 7/2008 | Blanz et al. | 370/329 |
| 2008/0318533 A1 * | 12/2008 | Rofougaran et al. | 455/73 |
| 2009/0017829 A1 * | 1/2009 | Laroia et al. | 455/446 |
| 2009/0207093 A1 * | 8/2009 | Anreddy et al. | 343/876 |
| 2010/0120460 A1 * | 5/2010 | Karlsson et al. | 455/517 |

FOREIGN PATENT DOCUMENTS

| | | |
|---|---|---|
| EP | 0 824 801 | 8/2002 |
| KR | 10-2000-0031837 | 6/2000 |
| KR | 10-2000-0053160 | 8/2000 |
| KR | 10-2001-0016215 | 3/2001 |
| KR | 2001-0016215 | 3/2001 |
| KR | 2001-0112361 | 12/2001 |

* cited by examiner

*Primary Examiner* — Eunsook Choi
(74) *Attorney, Agent, or Firm* — Staas & Halsey LLP

(57) ABSTRACT

Provided is a method and apparatus for transmitting and receiving data using a polarization transmission in a line-of-sight (LOS) radio communication system. An for transmitting data using a polarization transmission in a LOS radio communication system may include: an antenna unit including at least two antennas to transmit or receive via a different polarization path; a polarization data setting unit to set the different polarization path for each of the at least two antennas; and a resource allocation unit to set a transmission scheme according to a data characteristic and a service type, and to allocate a resource to be transmitted via the different polarization path according to the transmission scheme.

5 Claims, 4 Drawing Sheets

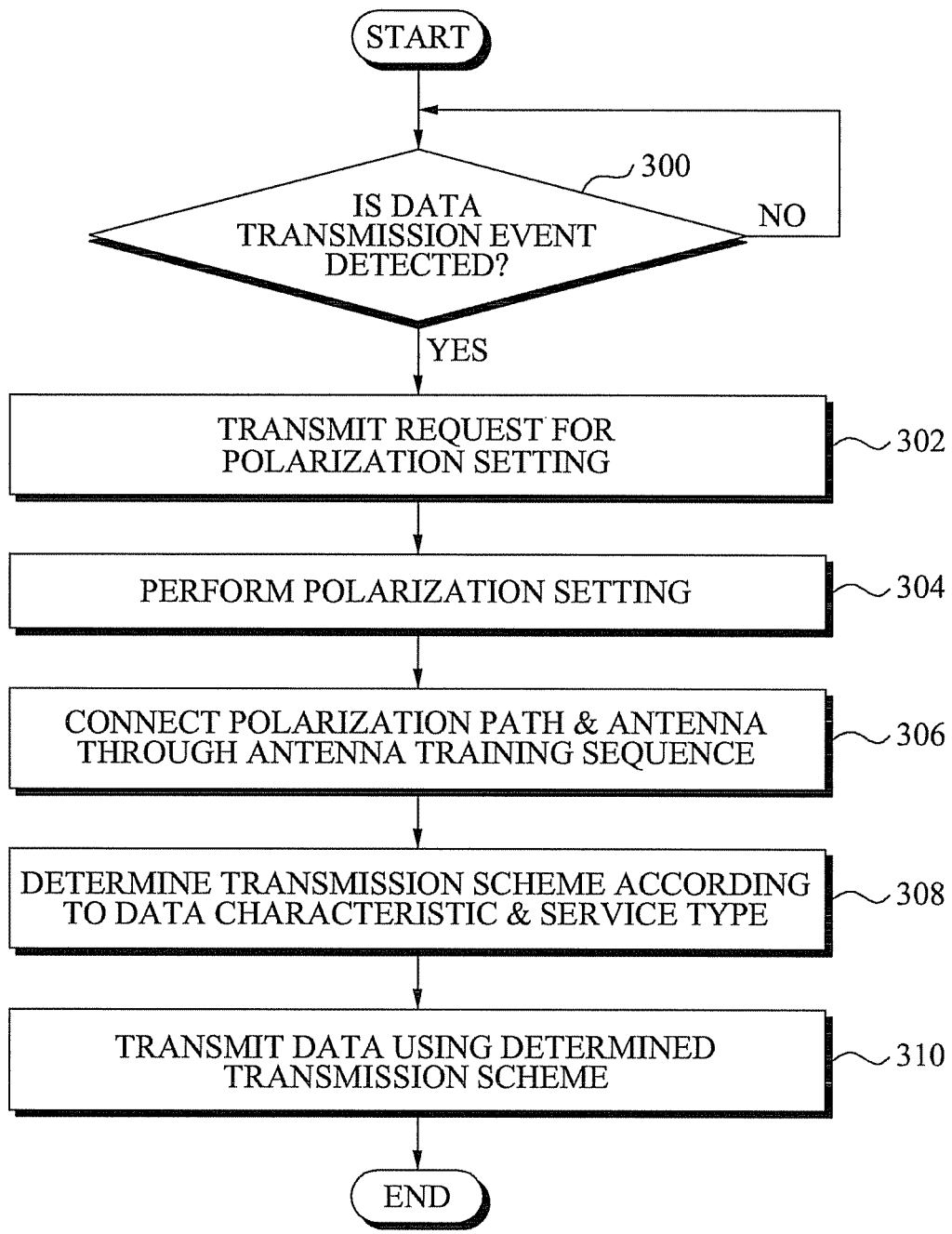

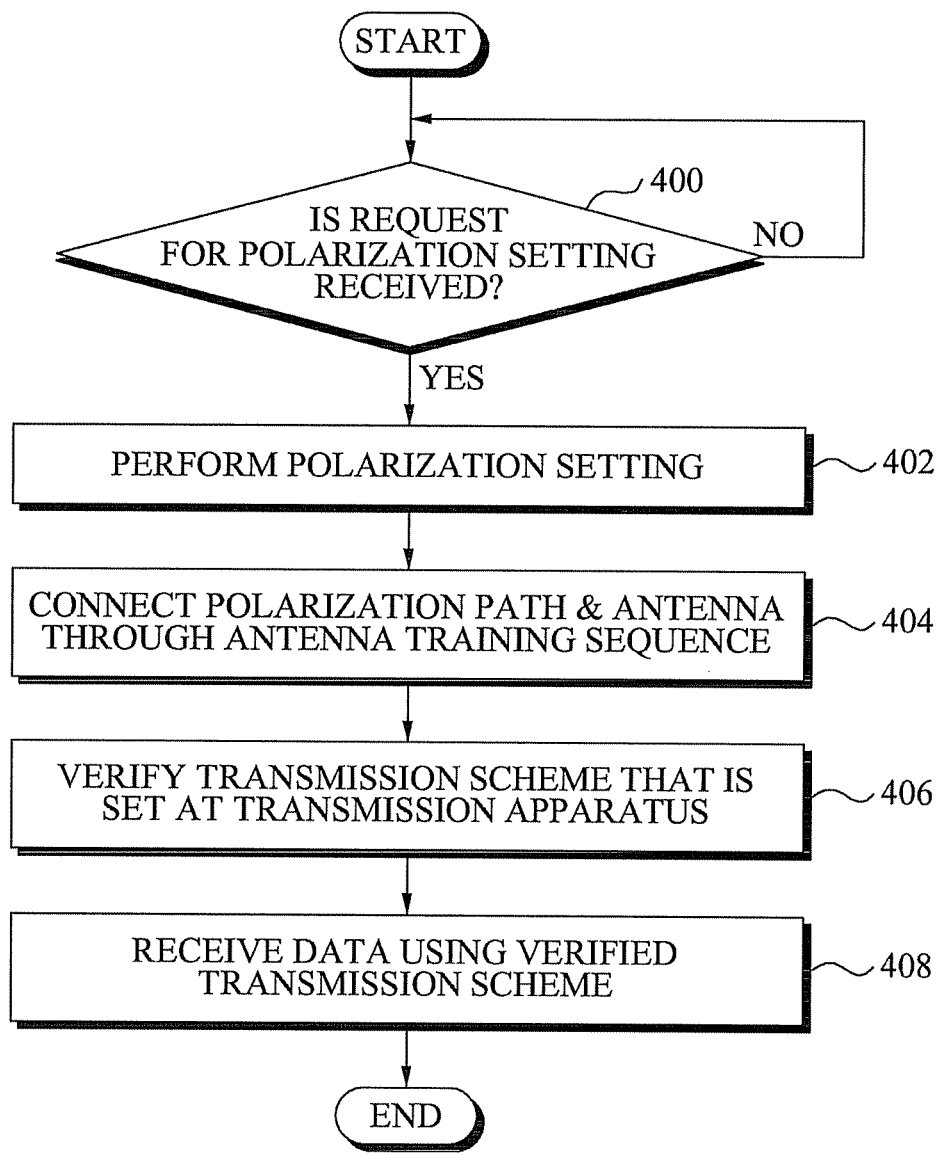

TRANSMISSION RECEPTION APPARATUS OF DATA USING POLARIZATION TRANSMISSION IN LOS RADIO COMMUNICATION SYSTEM

CROSS-REFERENCE TO RELATED APPLICATIONS

This application claims the benefit of Korean Patent Application No. 10-2008-0018024, filed on Feb. 27, 2008, and Korean Patent Application No. 10-2008-0127117, filed on Dec. 15, 2008, in the Korean Intellectual Property Office, the disclosures of which are incorporated herein by reference.

BACKGROUND

1. Field of the Invention

The present invention relates to a method and apparatus for transmitting and receiving data using a polarization transmission in a line-of-sight (LOS) radio communication system. More particularly, the present invention relates to a method and apparatus for transmitting and receiving data using a polarization diversity in a LOS radio communication system that may transmit data in 60 GHz or THz bandwidth using a directional antenna.

This work was supported by the IT R&D program of MIC/IITA.

2. Description of the Related Art

A scheme of using a path diversity in a line-of-sight (LOS) radio communication system may use at least two multiple paths using a time division scheme. The conventional scheme may control transmission and reception of data via the multiple paths according to the time division scheme. In this case, when transmitting data at a high speed to be greater than or equal to Gbps, a system efficiency may be deteriorated due to a delay or a response time that may occur when switching between the transmission and the reception. Also, due to an extension to the multiple paths, the switching operation may need to be more quickly performed. Accordingly, it is very difficult to embody an actual system.

SUMMARY

An aspect of the present invention provides a method and apparatus for transmitting and receiving data using a polarization transmission in a line-of-sight (LOS) radio communication system.

Another aspect of the present invention also provides a method and apparatus for transmitting and receiving data using a polarization diversity in a LOS radio communication system that may transmit data in 60 GHz or THz bandwidth using a directional antenna.

Another aspect of the present invention also provides a method and apparatus for transmitting data in a LOS radio communication system that may receive a control signal by using at least one of different polarization paths as an uplink, and may transmit the data by using at least one of the remaining polarization paths as a downlink.

Another aspect of the present invention also provides a method and apparatus for transmitting data in a LOS radio communication system that may sequentially transmit data by alternatively using different polarization paths.

Another aspect of the present invention also provides a method and apparatus for transmitting data that may transmit the same data via different polarization paths.

According to an aspect of the present invention, there is provided an apparatus for transmitting data using a polarization transmission in a LOS radio communication system, the apparatus including: an antenna unit including at least two antennas to transmit the data via a different polarization path; a polarization data setting unit to set the different polarization path for each of the at least two antennas; and a resource allocation unit to set a transmission scheme according to a data characteristic and a service type, and to allocate a resource to be transmitted via the polarization path according to the transmission scheme.

According to another aspect of the present invention, there is provided an apparatus for receiving data using a polarization transmission in a LOS radio communication system, the apparatus including: an antenna unit including at least two antennas to receive the data via a different polarization path; a polarization data setting unit to set the different polarization path for each of the at least two antennas; and a resource allocation unit to control the data to be received via the different polarization path according to a transmission scheme that is set at a transmission apparatus.

According to still another aspect of the present invention, there is provided a method of transmitting data using a polarization transmission in a transmission apparatus of a LOS radio communication system, the method including: setting a different polarization path for each of at least two antennas; connecting the polarization path and an antenna of a reception apparatus through an antenna training sequence; determining a transmission scheme according to a data characteristic and a service type; and transmitting the data using the determined transmission scheme.

According to yet another aspect of the present invention, there is provided a method of receiving data using a polarization transmission in a reception apparatus of a LOS radio communication system, the method including: setting a different polarization path for each of at least two antennas; connecting the polarization path and an antenna of a transmission apparatus through an antenna training sequence; verifying a transmission scheme that is set at the transmission apparatus; and receiving data via the different polarization paths according to the verified transmission scheme.

According to embodiments of the present invention, there is provided a method and apparatus for transmitting and receiving data using a polarization transmission in a LOS radio communication system, the apparatus including: an antenna unit comprising at least two antennas to transmit or receive the data via a different polarization path; a polarization data setting unit to set the different polarization path for each of the at least two antennas; and a resource allocation unit to set a transmission scheme according to a data characteristic and a service type, and to allocate a resource to be transmitted via the polarization path according to the transmission scheme.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 3 is a flowchart illustrating a method of transmitting data using a polarization transmission in a transmission apparatus of a LOS radio communication system according to an embodiment of the present invention; and FIG. 4 is a flowchart illustrating a method of receiving data using a polarization transmission in a reception apparatus of a LOS radio communication system according to an embodiment of the present invention.

DETAILED DESCRIPTION

Figure 1:
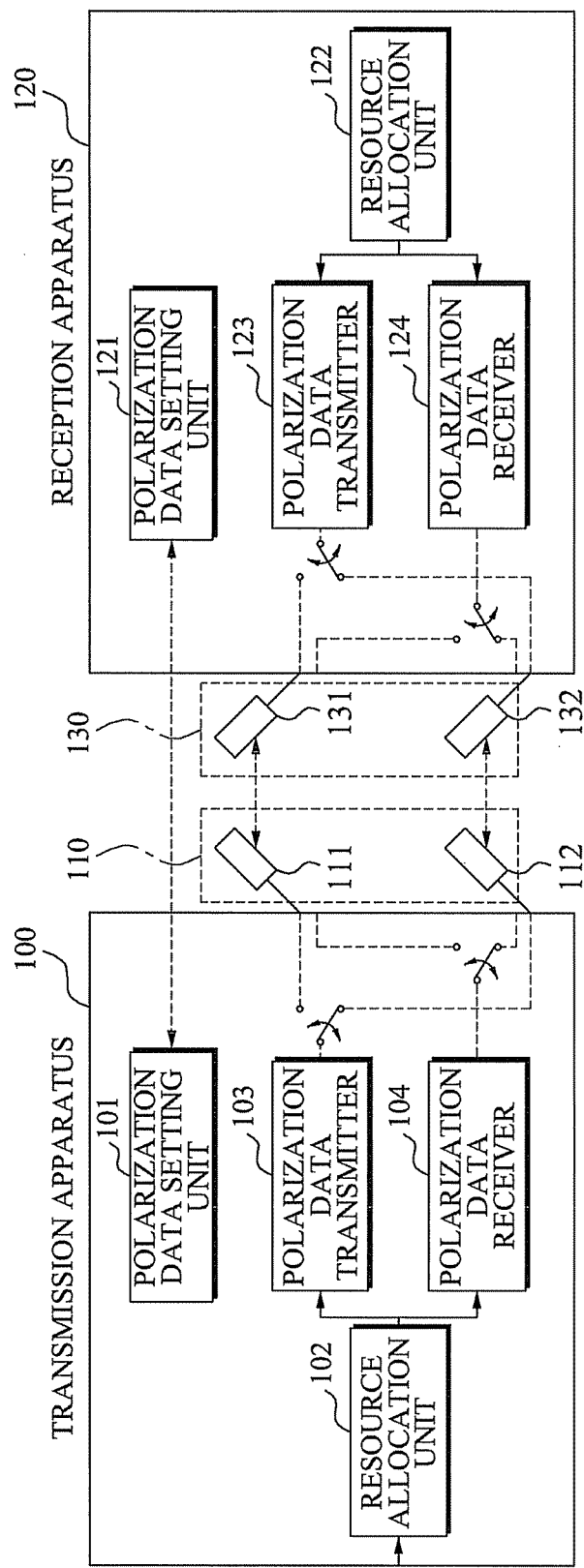
FIG. 1 is a block diagram illustrating a configuration of a data transmission apparatus and a data reception apparatus using a polarization transmission in a line-of-sight (LOS) radio communication system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Disclosed is a method and apparatus for transmitting and receiving data using a polarization diversity in a line-of-sight (LOS) radio communication system that may transmit data in 60 GHz or THz bandwidth using a directional antenna. Hereinafter, the system according to the present invention will be described in detail with reference to FIG. 1.

FIG. 1 is a block diagram illustrating a configuration of a transmission apparatus 100 and a reception apparatus 120 using a polarization transmission in a LOS radio communication system according to an embodiment of the present invention. Referring to FIG. 1, the LOS radio communication system may include the transmission apparatus 100 and the reception apparatus 120.

The transmission apparatus 100 may include a polarization data setting unit 101, a resource allocation unit 102, a polarization data transmitter 103, a polarization data receiver 104, an antenna unit 110 including polarization antennas 111 and 112, and an antenna control unit (not shown) to control the polarization antennas 111 and 112.

The polarization data setting unit 101 may request the reception apparatus 120 for a polarization setting, and may set a polarization path by performing the polarization setting with the reception apparatus 120.

Figure 2:
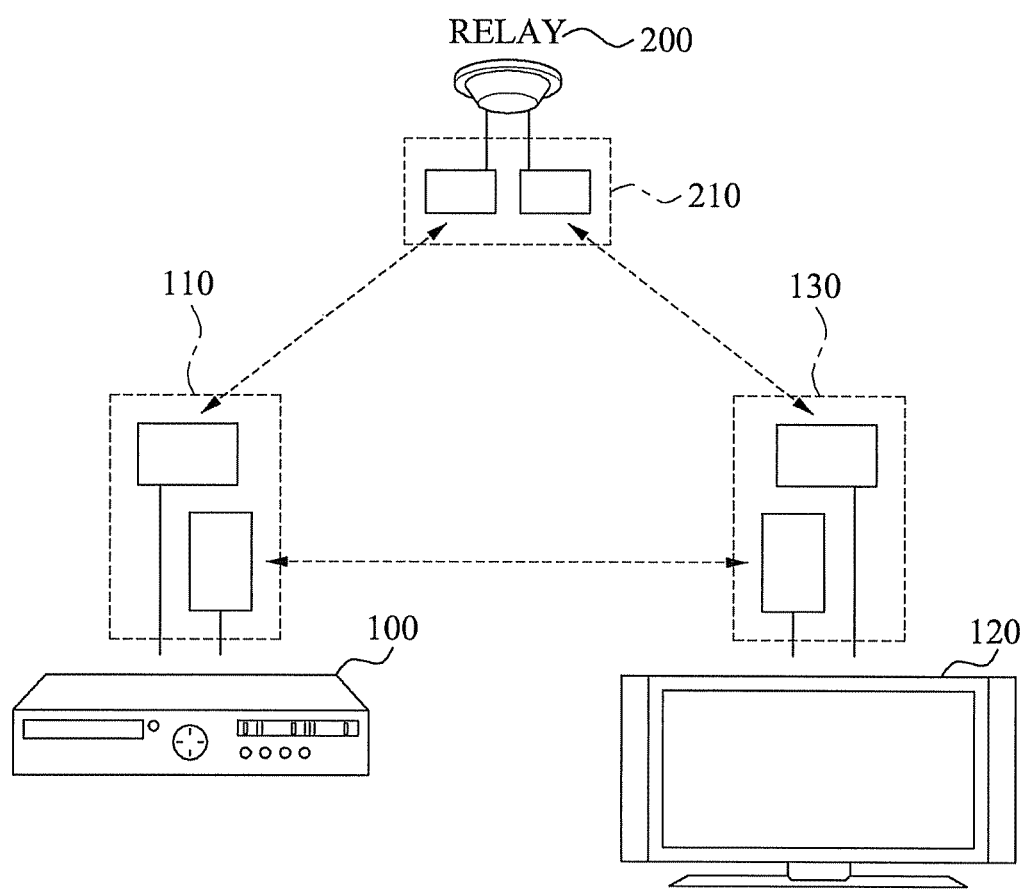
FIG. 2 illustrates an example of setting a polarization path via a relay in a LOS radio communication system according to an embodiment of the present invention.

The antenna control unit may connect polarization paths between antennas of the reception apparatus 120 and the polarization antennas 111 and 112 through an antenna training sequence. FIG. 2 illustrates an example of setting a polarization path via a relay 200 in a LOS radio communication system according to an embodiment of the present invention. When the relay 200 exists, an antenna control unit (not shown) may control the polarization path to be connected via an antenna 210 of the relay 200.

Referring again to FIG. 1, the polarization data transmitter 103 may transmit data via an antenna corresponding to a polarization path that is allocated by the resource allocation unit 102. The polarization data receiver 104 may receive the data via an antenna corresponding to another polarization path that is assigned by the resource allocation unit 102.

The resource allocation unit 102 may set a transmission scheme according to a data characteristic and a service type, and may allocate a resource to be transmitted via the different polarization paths according to the transmission scheme.

Hereinafter, the transmission scheme will be described by taking an example where the LOS radio communication system includes two polarization paths. Since the two polarization paths are independent channels, resources may be allocated using a simultaneously available property. For example, an asymmetric communication (e.g., real-time non-compressed video streaming service) of uni-directionally transmitting data from a transmission apparatus to a reception apparatus will be described. In this instance, one of the polarization paths may be allocated to uni-directionally stream data, and another polarization path may be allocated to transmit and receive a control signal. In the conventional scheme, it may be impossible to simultaneously transmit and receive data. Therefore, the conventional scheme may divide and use resources with respect to an uplink and a downlink using a time division or a frequency division. However, according to the present invention, it is possible to separately provide a data transmission path and a control signal transmission path and to simultaneously use the paths. Therefore, it is possible to quickly respond to a data loss. In particular, in the case of a service requiring a high data rate that may need to use the entire allocated channel, a resource for the uplink may need to be allocated to process a control signal such as acknowledgement (ACK). Also, due to a delay occurring when switching between a transmission and a reception, an interval between the uplink and the downlink may be required based on a turn-on time of a switching module and a transmission/reception module. In the case of the high data rate, a data transmission rate may be significantly affected due to the above time. However, when applying the disclosed scheme, it is possible to separately allocate data paths and to thereby prevent a data loss and to quickly process a signal transmission such as ACK.

As another example, an asymmetric communication of transmitting 1080p video will be described. In order to seamlessly transmit data even when a single path is interrupted by an obstacle, the asymmetric communication may transmit an odd line via one path and transmit an even line via another path. Accordingly, even when the path for transmitting the odd line is interrupted, another path may interpolate and play odd line data using an even line signal. Through this, it is possible to prevent an image from being damaged.

Hereinafter, the aforementioned transmission schemes will be summarized as follows:

Initially, a transmission scheme that may receive a control signal by using at least one of different polarization paths as an uplink and may transmit data by using at least one of the remaining polarization paths as a downlink;

Secondly, a transmission scheme that may sequentially transmit data by alternatively using different polarization paths when a characteristic of data, for example, video data is sensitive to a delay;

Thirdly, a transmission scheme that may transmit the same data via different polarization paths when a characteristic of data is sensitive to an error; and Fourthly, a bi-directional transmission scheme that may receive reception data by using at least one of different polarization paths as an uplink and may transmit transmission data by using at least one of the remaining polarization paths as a downlink. An example of the bi-directional transmission scheme may include a video communication.

Referring again to FIG. 1, the reception apparatus 120 may include a polarization data setting unit 121, a resource allocation unit 122, a polarization data transmitter 123, a polarization data receiver 124, an antenna unit 130 including polarization antennas 131 and 132, and an antenna control unit (not shown) to control the polarization antennas 131 and 132.

When a request for a polarization setting is received from the transmission apparatus 100, the polarization data setting unit 121 may set a polarization path by performing the polarization setting with the transmission apparatus 100.

The antenna control unit may connect polarization paths between antennas of the reception apparatus 120 and the polarization antennas 131 and 132 through an antenna training sequence. Also, when the relay 200 exists, the antenna control unit may control the polarization path to be connected via an antenna 210 of the relay 200, as shown in FIG. 2.

The polarization data transmitter 123 may transmit data via an antenna corresponding to a polarization path that is allocated by the resource allocation unit 122. The polarization data receiver 124 may receive the data via an antenna corresponding to another polarization path that is assigned by the resource allocation unit 122.

The resource allocation unit 122 may verify the transmission scheme that is set at the transmission apparatus 100, and allocate polarization resources so that data may be received via the different polarization paths. The verified transmission scheme is the same as described above in the transmission apparatus 100.

Hereinafter, a method of transmitting and receiving data using a polarization transmission in a LOS radio communication system, constructed as above, will be described with reference to FIGS. 3 and 4.

FIG. 3 is a flowchart illustrating a method of transmitting data using a polarization transmission in a transmission apparatus of a LOS radio communication system according to an embodiment of the present invention.

Referring to FIG. 3, in operation 300, it is determined whether a data transmission event is detected. When the data transmission event is detected, the transmission apparatus may request a reception apparatus for a polarization setting in operation 302. In operation 304, the transmission apparatus may set a different polarization path for each of at least two antennas. In operation 306, the transmission apparatus may connect the polarization path and an antenna of the reception apparatus through an antenna training sequence. Here, each the at least two antennas may include directional antennas.

In operation 308, the transmission apparatus may determine a transmission scheme according to a data characteristic and a service type. In operation 310, the transmission apparatus may transmit the data using the determined transmission scheme.

Here, four transmission schemes may be set according to the data characteristic and the service type, and may include:

Initially, a transmission scheme that may receive a control signal by using at least one of different polarization paths as an uplink and may transmit data by using another at least one of the remaining polarization paths as a downlink;

Secondly, a transmission scheme that may sequentially transmit data by alternatively using different polarization paths when a characteristic of data, for example, video data is sensitive to a delay;

Thirdly, a transmission scheme that may transmit the same data via different polarization paths when a characteristic of data is sensitive to an error; and Fourthly, a bi-directional transmission scheme that may receive reception data by using at least one of different polarization paths as an uplink and may transmit transmission data by using at least one of the remaining polarization paths as a downlink. An example of the bi-directional transmission scheme may include a video communication.

FIG. 4 is a flowchart illustrating a method of receiving data using a polarization transmission in a reception apparatus of a LOS radio communication system according to an embodiment of the present invention.

Referring to FIG. 4, in operation 400, the reception apparatus may determine whether a request for a polarization setting is received from a transmission apparatus. In operation 402, the reception apparatus may set a different polarization path for each of at least two antennas. In operation 404, the reception apparatus may connect the polarization path and an antenna of the transmission apparatus through an antenna training sequence. In operation 406, the reception apparatus may verify a transmission scheme that is set at the transmission apparatus. The transmission scheme has been described above, and thus further detailed description related thereto will be omitted here.

In operation 408, the reception apparatus may receive data via the different polarization paths according to the verified transmission scheme.

The exemplary embodiments of the present invention include computer-readable media including program instructions to implement various operations embodied by a computer. The media may also include, alone or in combination with the program instructions, data files, data structures, tables, and the like. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of transmitting data using a polarization transmission in a transmission apparatus of a line-of-sight (LOS) radio communication system, the method comprising:

setting a different polarization path for each of at least two antennas as independent channels usable simultaneously;

connecting the polarization path and an antenna of a reception apparatus through an antenna training sequence;

determining a transmission scheme according to a data characteristic and a service type; and transmitting the data using the determined transmission scheme, wherein the transmission scheme receives reception data of a control signal by using at least one of different polarization paths as an uplink and simultaneously transmits transmission data of unidirectional stream data by using at least one of the remaining polarization paths as a downlink.

2. The method of claim 1, wherein each of the at least two antennas includes a directional antenna.

3. The method of claim 1, wherein the transmission scheme receives a control signal by using at least one of the different polarization paths as an uplink, and transmits the data by using at least one of the remaining polarization paths as a downlink.

4. The method of claim 1, wherein the transmission scheme sequentially transmits the data by alternatively using the different polarization paths.

5. The method of claim 1, wherein the transmission scheme transmits the same data via the different polarization paths.

* * * * *